Figure 1:
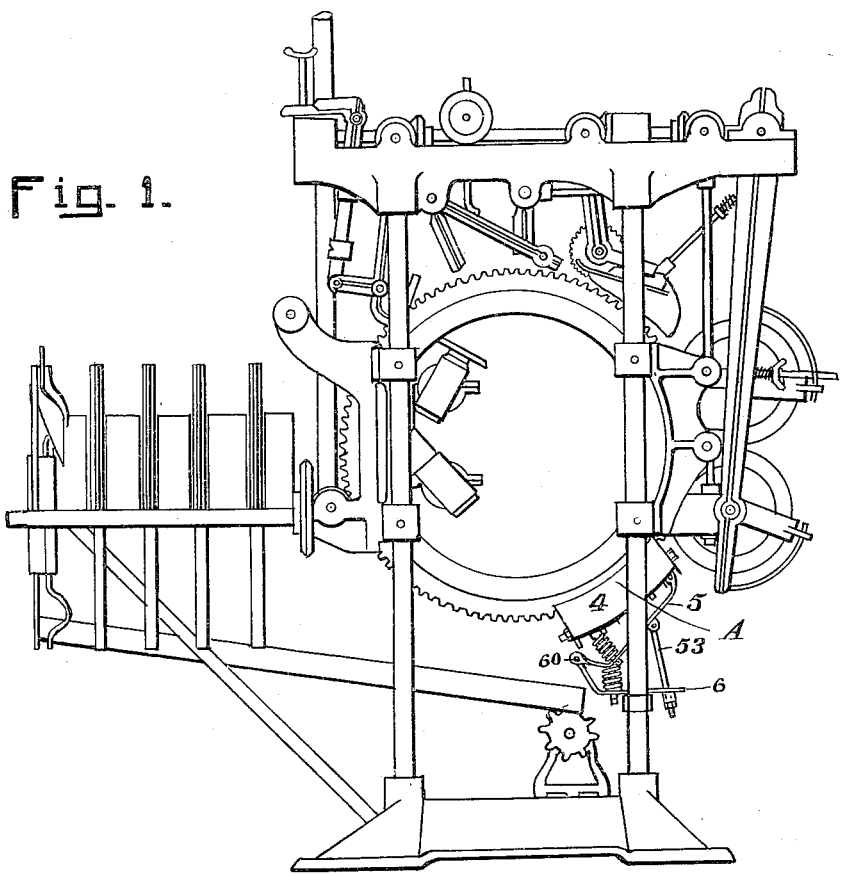

N. B. ANDERSON.
CLEANING ATTACHMENT FOR FISH DRESSING MACHINES.
APPLICATION FILED NOV. 2, 1914.

1,137,449.

Patented Apr. 27, 1915.

WITNESSES.

INVENTOR.
Nels Bernhard Anderson.

N. B. ANDERSON.
CLEANING ATTACHMENT FOR FISH DRESSING MACHINES.
APPLICATION FILED NOV. 2, 1914.
1,137,449.
Patented Apr. 27, 1915.
2 SHEETS—SHEET 2.
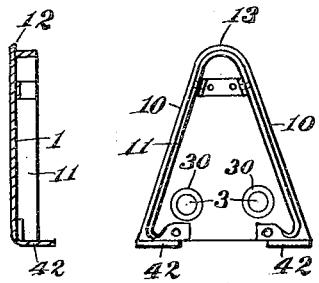
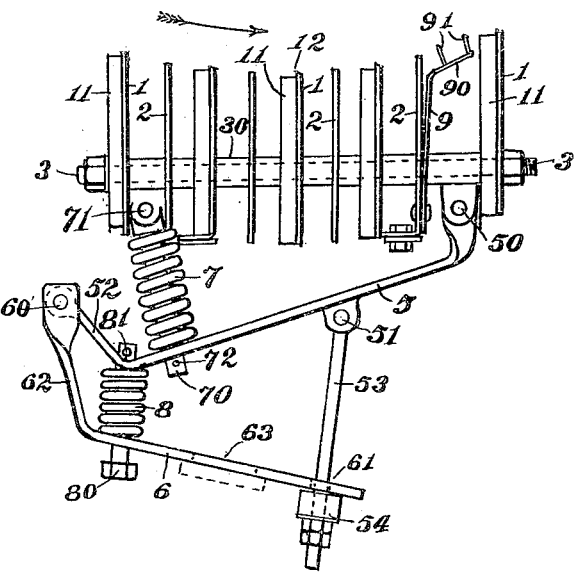
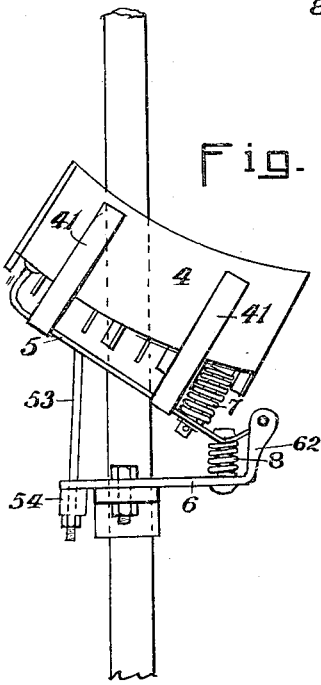
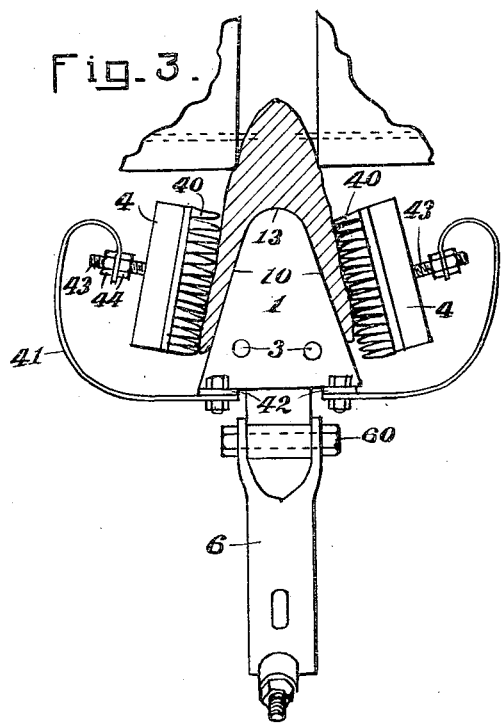
WITNESSES
INVENTOR
Nels Bernhard Anderson.
By Henry L. Reynolds
ATTORNEY.

UNITED STATES PATENT OFFICE.

NELS BERNHARD ANDERSON, OF BELLINGHAM, WASHINGTON, ASSIGNOR OF FOUR-FIFTHS TO EVERETT B. DEMING, OF BELLINGHAM, WASHINGTON.

CLEANING ATTACHMENT FOR FISH-DRESSING MACHINES.

1,137,449.   Specification of Letters Patent.   Patented Apr. 27, 1915.

Application filed November 2, 1914.   Serial No. 869,999.

*To all whom it may concern:*

Be it known that I, NELS BERNHARD ANDERSON, a subject of the King of Norway, (who has taken out his first citizenship papers in the United States,) and resident of Bellingham, Whatcom county, Washington, have invented certain new and useful Improvements in Cleaning Attachments for Fish-Dressing Machines, of which the following is a specification.

My invention relates to fish cleaning machines, and consists of an attachment for such machines intended to more thoroughly remove the entrails and waste material from the abdominal cavity.

My invention consists of the parts and combinations of parts which are herein set forth and particularly defined by the claims.

In the accompanying drawings I have shown my invention in the form which is now preferred by me.

Figure 1 is a side elevation of a machine of the type to which my invention is intended to be applied. Fig. 2 is a side elevation of my attachment separate from the machine to which it is applied, one presser being removed. Fig. 3 is an end elevation of my attachment. Fig. 4 is a side elevation of my attachment with the presser members in place. Fig. 5 is a face view of one of the scraper blades. Fig. 6 is a section through the scraper blade of Fig. 5.

My invention is intended for application to fish cleaning or dressing machines of that type which pass the fish through a fixed path and in a fixed position, during which passage they are acted upon successively by various devices which each performs its special work.

The particular style of machine of this general type which I have chosen for the purpose of illustrating the application of my invention, is that shown in the patent to Smith, No. 998,129 of July 18, 1911.

Experience with these machines has shown that their action is imperfect in respect to the complete and cleanly removal of the offal from the abdominal cavity. It is the purpose of my attachment to contribute to the perfection of this result.

My attachment is designed to be placed so as to act upon the fish just before it is released from the control of the machine; that is, it acts upon the fish after it has been acted upon by the other devices. The point of its application is indicated at A, in Fig. 1.

A description of the construction and operation of the machines to which it is attached is not believed to be necessary, as this is well understood and is set forth in said patent. This machine is provided with means for holding the fish and carrying them, in a fixed position, through a definite path of travel. In the earlier parts of said path the fins are removed and the abdomen slit, whereupon means are applied which are designed to remove the entrails. My device is intended as a substitute for, or as a supplement to, said latter means. At any point following the slitting of the abdomen, where it is found most convenient and effective to do so, this device is placed so as to engage with the fish. The fish, as handled by such a machine, is carried about the periphery of a pair of drums, occupying the narrow space between the peripheral edges of said drums, where it is held securely with the belly of the fish outward.

The cleaning device comprises a series of cleaning plates, 1 and 2, having an edge outline such as to adapt them to extend transversely across and fill the abdominal cavity. These plates are held by a yielding pressure in this cavity and as the fish passes by them they scrape this cavity and remove therefrom all offal contained therein.

The preferred outline of these plates is shown in Fig. 3. This outline may be made whatever is found to best answer for the cleaning of any particular fish. These plates should be secured together so that the entire series form a cohesive structure which may be controlled together. As preferred, the plates are secured together by a pair of bolts 3, which pass through all the plates and by spacers 30, which are interposed between successive plates.

I prefer that the plates be alternately of slightly different character. The plates 2 are plain, but may have their edges roughened, if desired. The plates 1, are however, slightly sharpened on their scraping edges, that is, they are given a wide-angle bevel 12. They also have a flange 11 which lies just inward from the scraping edges and projects from the face of the scraper blade which faces toward the oncoming fish. As the device is shown in Fig. 2, the fish is supposed to be moved from the left hand toward the right hand end, or as indicated by the arrow.

A pair of presser members 4, are provided to coöperate with the scrapers by holding the sides of the fish against the scrapers. These pressers consist of backs 4, having yielding brush members 40, projecting from their inner sides toward the scraper blades. They are held in a yielding manner, so that they will accommodate themselves to varying thickness of fish sides. I have shown this as secured by mounting them upon springs 41, which are secured to flanges 42 carried by certain of the scraper blades, and by bolts 43 carried by the backs 4 and provided with adjusting nuts 44, whereby their position and the tension of the springs may be adjusted.

The device is supported from an arm 5, which is pivoted to one end thereof, as at 50. This arm is in turn pivoted by its other end to a fixed arm 6, as by pivot 60. The end of the device which is opposite to that which is pivoted to the arm 5, is supported by a spring 7, which is interposed between the device and this end of arm 5. A bolt or link 70, passes through the center of the spring and is pivoted by one end to the scraper structure by pivot 71, while the other end passes through a hole in the arm 5 and is prevented from withdrawal therefrom by a stop 72.

The arm 5 is, in turn, supported by a spring 8, interposed between it and the fixed arm 6, or whatever support may be substituted therefor. This is likewise provided with a bolt 80, which passes through both arms and the spring and is provided with a stop 81. The separation of the outer or swinging end of the arm 5 from the arm 6, is controlled by a rod or bolt 53, which is pivoted at 51 to arm 5 and passes through arm 6, being provided with adjustable nuts 54, to limit the separation of these two arms. Arm 6 may be provided with a hole 63, by which it may be secured to the frame of the machine, or to a bar which is in turn secured upon the machine frame. The fish being operated upon, is being carried along with its tail end forward and is held by mechanism which grasps its back line. When it comes to this cleaning device, the flanks or side walls of the abdominal cavity, are separated and pass, one at each side of the scrapers blades 1 and 2, as is indicated in Fig. 3. At the same time the presser members 4, engage the outer surfaces of these flanks to hold them into firm and continuous contact with the scrapers. The result is that the inner walls of the abdominal cavity are thoroughly scraped and cleaned. The device being spring supported, will yield so as to accommodate fish of considerable difference in size.

What I claim as my invention and desire to secure by Letters Patent is:

1. An attachment for fish cleaning machines comprising a series of scraper blades adapted to enter the slitted abdominal cavity, each alternate blade being provided with a beveled edge and a face-projecting flange just within such beveled edges.

2. An attachment for fish cleaning machines comprising a series of scraper blades adapted to enter the slitted abdominal cavity, means for securing said blades together in fixed relation, a supporting bar to which one end of the series of blades is pivotally secured, a pivotal support for the other end of said bar, and springs acting to sustain said scraper blades in contact with the fish.

3. An attachment for fish cleaning machines comprising a series of scraper blades secured together in fixed relation, a supporting bar hinged by one end to one end of said series of blades, a spring interposed between the other end of the series of blades and their supporting bar, and a spring acting to sustain said bar.

4. An attachment for fish cleaning machines comprising a series of scraper blades secured together in spaced relation, presser members located at each side said blades, springs connecting said presser members with the bases of the scrapers, and acting to hold the pressers toward the scrapers, a supporting bar pivoted by one end to one end of the series of scrapers, a spring interposed between the other end of the scrapers and said bar, the other end of said bar being pivotally supported, and a spring acting to support said hinged bar.

5. An attachment for fish cleaning machines comprising a series of scrapers secured together in fixed relation, a pivoted lever supporting mechanism for said scrapers, springs acting to yieldingly hold the scrapers in contact with the fish, and pressers lying outwardly of the flanks of the scrapers and carried from a common support therewith.

6. The combination with means for conveying fish lengthwise through a definite path, of a series of scraper blades secured together in fixed relation with their axis substantially paralleling the path of the fish, a support for said scrapers comprising a lever pivoted by one end to one end of the series of scrapers and by its other end to a fixed support, a spring acting to hold the swinging end of the lever toward the fish and a spring acting between the lever and the series of scrapers to hold the swinging end of the latter toward the fish.

7. The combination with means for conveying fish lengthwise through a definite path, of a series of scrapers secured together with their axis substantially paralleling the path of the fish, a lever pivoted by one end to one end of said series of scrapers and by its other end to a fixed support, springs acting between the said lever and its support and between the lever and the scrapers to swing each toward the fish, and a presser lying outside each flank of the scrapers and spring pressed toward the scrapers.

8. In a device of the character described, a series of scrapers adapted to enter the abdominal cavity of a fish, a support for said scrapers comprising a lever pivoted by one end to one end of the series of scrapers and by its other end to a fixed support, and springs acting to hold said scrapers toward the fish.

In testimony whereof I have hereunto affixed my signature this 23 day of October, 1914.

NELS BERNHARD ANDERSON.

Witnesses:
E. D. MILLER,
S. A. DEMING.

Copies of this patent may be obtained for five cents each, by addressing the "Commissioner of Patents, Washington, D. C."